(12) United States Patent  
Patterson

(10) Patent No.: US 7,426,524 B2  
(45) Date of Patent: Sep. 16, 2008

(54) UPDATE PROCESSES IN AN ENTERPRISE PLANNING SYSTEM

(75) Inventor: James Edmund Patterson, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 11/236,024

(22) Filed: Sep. 27, 2005

(65) Prior Publication Data

US 2007/0073737 A1    Mar. 29, 2007

(51) Int. Cl.  
*G06F 17/00* (2006.01)

(52) U.S. Cl. .................... 707/103 R; 707/101; 707/102

(58) Field of Classification Search ............. 707/1, 707/6, 10, 100, 101, 102, 104.1; 705/36, 705/36 R; 703/22  
See application file for complete search history.

(56) References Cited

U.S. PATENT DOCUMENTS

| | | | | |
|---|---|---|---|---|
| 7,222,302 B2 * | 5/2007 | Hauser et al. | ............... | 715/734 |
| 2003/0144868 A1 * | 7/2003 | MacIntyre et al. | ............. | 705/1 |
| 2004/0233056 A1 | 11/2004 | Pulfer | | |
| 2004/0267395 A1 * | 12/2004 | Discenzo et al. | ............... | 700/99 |
| 2005/0198073 A1 * | 9/2005 | Becks et al. | ............. | 707/104.1 |
| 2006/0015805 A1 | 1/2006 | Humenansky et al. | | |
| 2007/0016432 A1 * | 1/2007 | Piggott et al. | ................... | 705/1 |
| 2007/0266366 A1 * | 11/2007 | Bucuvalas | ................... | 717/104 |

OTHER PUBLICATIONS

David F. Ferraiolo et al., "The role control center: features and case studies", 2003, ACM, New York, NY, USA, pp. 12-20.*  
International Search Report and Written Opinion from corresponding PCT Application Serial No. PCT/US06/36770 mailed Nov. 8, 2007 (8 pages).

* cited by examiner

*Primary Examiner*—Diane Mizrahi  
(74) *Attorney, Agent, or Firm*—Shumaker & Sieffert, P.A.

(57) ABSTRACT

An enterprise planning system accumulates newly submitted planning data in a manner that minimizes database contention, allows ongoing entry of planning data, and allows queries against that data to return consistent results while accumulations are ongoing. An "update process" is the set of activities required to bring the entire data store up to date with a newly submitted value set. The activities may be interleaved with an arbitrary number of other submitted value set changes (other update processes). The enterprise planning system also provides for labeling of consistent sets and removal of obsolete versions of value sets.

20 Claims, 12 Drawing Sheets

UPDATE PROCESSES IN AN ENTERPRISE PLANNING SYSTEM

TECHNICAL FIELD

The invention relates to enterprise computing environments, and more particularly, to computing environments for enterprise business planning.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligent tools, enterprise reporting tools, project and resource management systems and other enterprise software systems.

Some classes of enterprise planning applications, such as planning and budgeting, for example, require a large population of users to enter data that the software then aggregates into higher level areas of responsibility in the organization. The system may perform mathematical calculations on the data, combining data submitted by one user with data submitted by another. Using the results of these calculations, the system may generate reports for review by higher management.

As enterprises become larger and more sophisticated, data accumulation and report generation can become very complex. Many levels of intermediate calculation may be required before the results are aggregated into the highest level nodes of the organization hierarchy. One conventional technique for accumulating data involves performing accumulations within a single database transaction from the leaf nodes to the top of the organizational hierarchy. This method, however, can experience high amounts of contention for data representing the higher level nodes, since the accumulation process concentrates summaries into these higher levels. Another conventional approach defers accumulations until predefined times, typically overnight or on "off hours." During these predefined times, users are prevented from entering new data while the system accumulates the data and generates any requested reports. Overnight processing can lead to significant time delays between the collection of data and the generation of a report. In addition, there are no "off hours" for an enterprise with worldwide operations. These problems can be particularly problematic in a deadline-oriented activity like enterprise planning.

SUMMARY

In general, this invention is directed to techniques for maintaining logically consistent data for an enterprise software system. Specifically, the techniques maintain distinct versions of enterprise data within a persistent data store. When a user submits new sets of values to the system, the system maintains a copy of the older sets of values. The system then launches a set of tasks to update the rest of the data store to reflect the new sets of values. This set of tasks is referred to herein as an "update process." Careful management of the update process allows the system to access consistent records without stopping the system or concentrating calculation at root nodes. Many separate update processes may be operating in the system at any given time.

In one embodiment, a method comprises storing enterprise planning data in a data store according to a calculation model for an enterprise planning system, wherein the calculation model includes a plurality of hierarchically arranged nodes, and wherein each node has a corresponding level measure, receiving a submitted value set from a user corresponding to one or more leaf nodes in the calculation model, initiating an update process to accumulate the submitted value set into the data store, wherein the update process includes a set of activities each corresponding to a node in the calculation model, determining a lowest level measure from among the set of available activities, scheduling all available activities having the lowest level measure, and executing the scheduled activities.

In another embodiment, a system comprises an enterprise planning system that executes an enterprise planning session for a set of enterprise users in accordance with a calculation model, wherein the calculation model defines hierarchically arranged nodes, and an update process manager that initiates update processes to accumulate submitted value sets from users into the data store, wherein each update process includes a set of activities that correspond to nodes in the calculation model, wherein the update process manager further identifies potentially conflicting activities among the update processes, and wherein the update process manager identifies consistent versions of nodes in the calculation model in response to a query.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
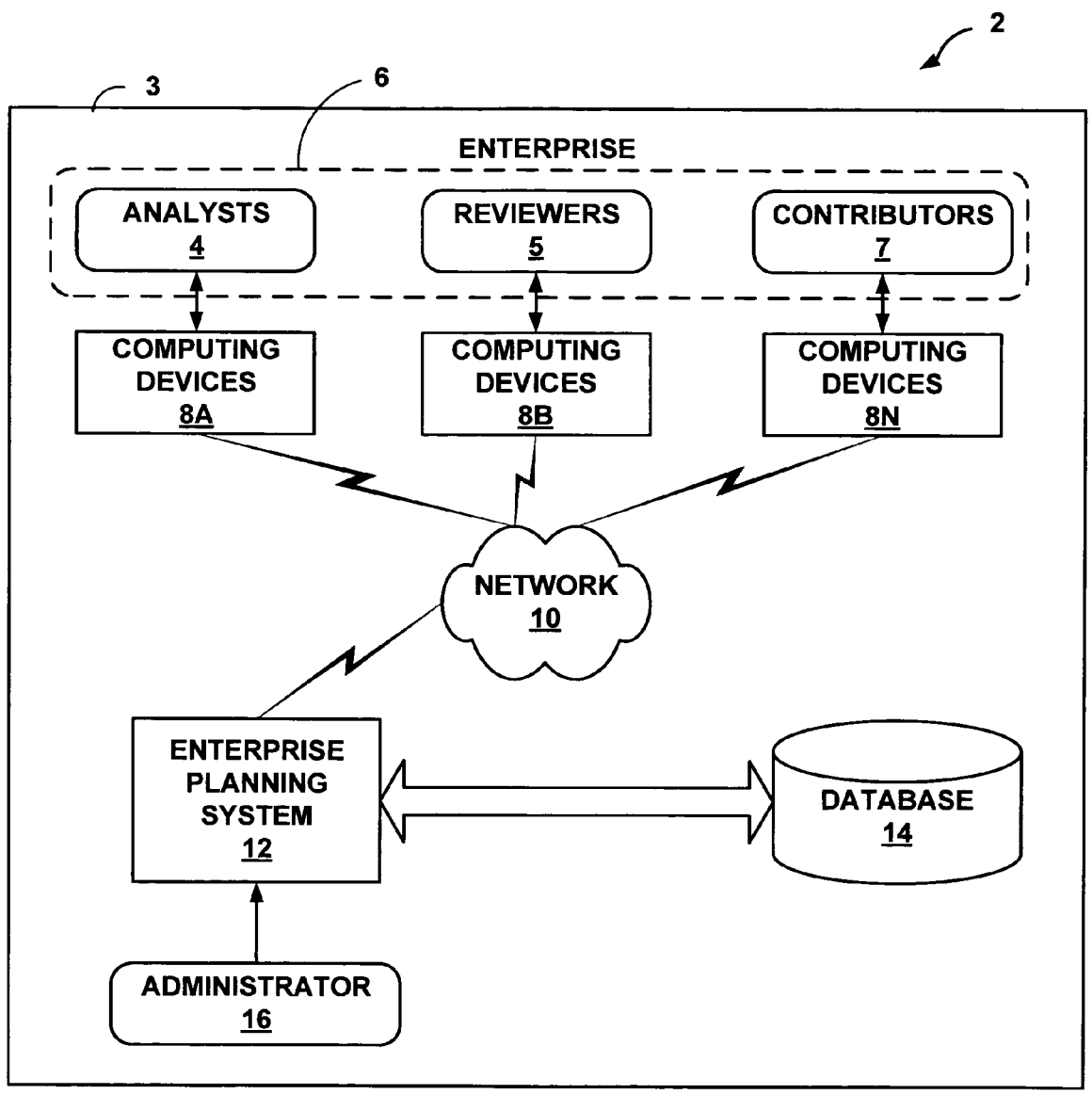
FIG. 1 is a block diagram illustrating an example computing environment in which a plurality of users interact with an enterprise software system.

FIG. 1 is a block diagram illustrating an exemplary computing environment 2 for an enterprise 4. In enterprise 3, a variety of users 6 interact with an enterprise planning system 12 through computing devices 8A-8N (collectively "computing devices 8"). Computing devices 8 communicate with each other and with enterprise planning system 12 through a network 10. Enterprise planning system 12 also communicates with a database 14. An administrator 16 configures and maintains enterprise planning system 12.

For exemplary purposes, the invention is described in reference to an enterprise planning system, such as an enterprise financial planning, budget planning, marketing planning, or other business planning system. The techniques described herein may be readily applied other software systems, including other large-scale enterprise software systems. Examples of other enterprise software systems include order management systems, inventory management systems, sales force management systems, business intelligent tools, enterprise reporting tools, project and resource management systems.

Generally, enterprise planning system 12 provides three stages of enterprise planning: a modeling stage, a contribution stage, and a reconciliation stage. In the modeling stage, a subset of users 6 referred to as analysts 3, such as the chief financial officer, senior financial analysts or product and sales analysts, define requirements and build planning models for the enterprise 3. More specifically, analysts 4 develop a model having a number of hierarchically arranged nodes representing various organizational units within enterprise 3, such as business units or departments, and also representing computational relationships between variables within each organizational unit.

During the modeling stage, analysts 4 also establish corporate targets for each node of the organizational hierarchy. Analysts 4 then assign one or more enterprise users, such as managers, supervisors, sales representatives, lab managers, or the like, that are responsible for enterprise planning for the corresponding organizational unit, to one or more nodes in the hierarchy. Typically, each user is generally responsible for one or more nodes belonging to their respective organizational unit. Other users will be responsible for similar nodes for other organizational units. Each enterprise user may be designated as a contributor 7 that provides planning data to enterprise system 12, a reviewer 5 that accepts or rejects contributions from contributors 7, or both. Contributors 7 and reviewers 5 may be authorized users within enterprise 3 or within other entities coupled to network 10, such as suppliers and customers.

Next, enterprise planning system 12 enters the contribution phase during which contributors 7 interact with enterprise planning system 12 and input detailed information in the form of contribution data. For example, contributors 7 may provide detailed financial forecasts, revenue forecasts, order forecasts, inventory forecasts, estimated resource requirements and the like, depending on the particular enterprise planning activity being carried out by enterprise 3. The system may also be used for other types of planning such as marketing campaign planning, retail outlet planning, or any other business planning activity.

During reconciliation, enterprise planning system 12 automates the reconciliation of the forecast data with the corporate targets provided by analysts 4. Enterprise planning system 12 may accumulate the contribution data across enterprise 3 and provide access to the accumulated data to reviewers 5 associated with higher levels of enterprise 3. Enterprise planning system 12 identifies all higher levels of the organizational model affected by the newly received contribution data, and accumulates the results into the higher levels of the hierarchy. Enterprise planning system 12 accumulates the data in a manner that minimizes database contention, allows ongoing entry of planning data, and allows queries against that data to return consistent results while accumulations are ongoing.

At each level, enterprise planning system 12 ensures that reviewers 7, as defined by the nodes of the enterprise model, reconcile the target data with the forecast data. Each reviewer 7 may, for example, reject or accept the contribution data in view of corporate targets provided by analysts 8. This process continues until the contribution data is ultimately approved by the highest level of the organizational hierarchy, thereby ensuring that the contribution data from contributors 6 reconciles with corporate targets provided by analysts 8.

Enterprise planning system 12 therefore enables organizations to reconcile corporate models and organizational targets with detailed forecasts, and provides a platform that delivers collaborative planning capabilities that can readily scale to thousands of users.

Enterprise users, such as contributors 7, analysts 4 and reviewers 5, may use a variety of computing devices 8 to interact with enterprise planning system 12 via network 10. For example, an enterprise user 6 may interact with enterprise planning system 12 using a laptop computer, desktop computer, or the like, running a web browser, such as Internet Explorer™ from Microsoft Corporation of Redmond, Wash., or Netscape from Netscape Communications Corp.

In another embodiment, users 6 may work off-line using an extended conventional spreadsheet software application such as Microsoft Excel™ provided by Microsoft Corporation, Quattro™ Pro of Corel and Lotus 1-2-3™ of IBM as described in copending and commonly assigned U.S. patent application Ser. No. 10/965,321, to Humenansky, et al., filed Oct. 14, 2004, which is incorporated herein by reference in its entirety. The functionality of spreadsheet application may be extended as described in that application to provide enterprise users with the capability to view and edit multidimensional data, e.g., data located within a multidimensional data store maintained by enterprise planning system 12, in an electronic worksheet environment. This allows users to leverage existing spreadsheet functionality, e.g., formatting, graphing, and other functions, while interacting with a complex, multidimensional data store.

Alternatively, an enterprise user may use a personal digital assistant (PDA), such as a Palm™ organizer from Palm Inc. of Santa Clara, Calif., a web-enabled cellular phone or similar device. Network 10 represents any communication network, such as a packet-based digital network like the Internet. In this manner, system 2 can readily scale to suit large enterprises. The enterprise users 6 may directly access enterprise planning system 12 via a local area network, or may remotely access enterprise planning system 3 via a virtual private network, remote dial-up, or similar remote access communication mechanism.

System 2 also includes a database 14 that stores value sets for each node in the model. Database 14 may be embodied in a number of ways. For example, database 14 could be a relational database such as SQL Server by Microsoft Corporation of Redmond, Wash. or Oracle Database by Oracle Corporation of Redwood Shores, Calif. The database could also be an object-oriented or other type of database.

Each time a user 6 submits a new value set, enterprise planning system 12 performs a set of background activities to incorporate the new value set into the overall data store for enterprise 3. These background activities may take place asynchronously from the submission task. The set of tasks or activities needed to bring the entire data store into sync with a newly submitted value set is referred to herein as an "update process." In a large enterprise, there may be many employees submitting new value sets. Consequently, there may be many update processes concurrently running within enterprise planning system 12.

Figure 2:
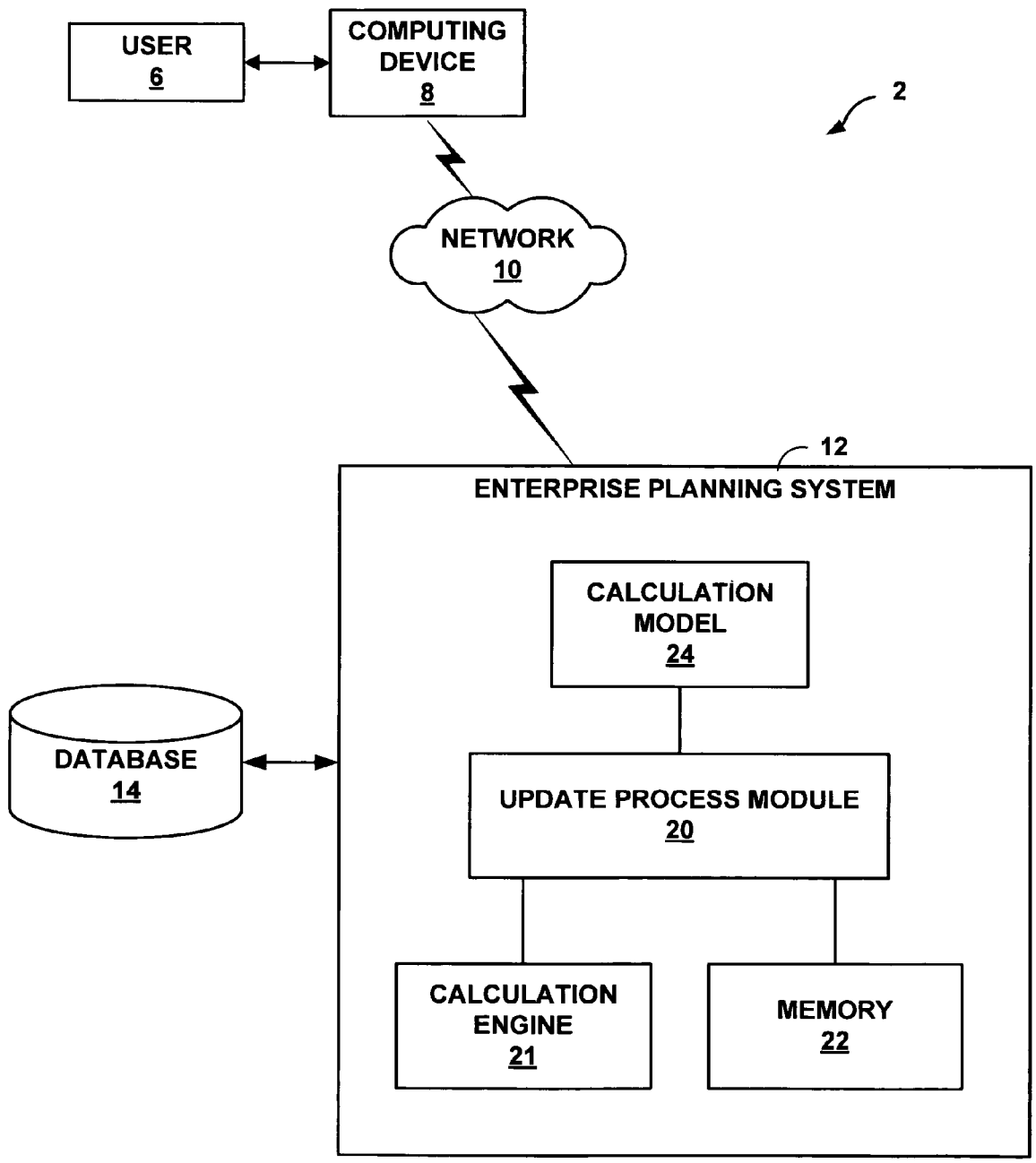
FIG. 2 is a block diagram illustrating one example of an enterprise planning system in further detail.

FIG. 2 is a block diagram illustrating one example of an enterprise planning system 12 in further detail. It shall be understood that enterprise planning system 12 includes other functional components as well, and that only those portions of enterprise planning system 12 most relevant to the present invention are shown. Users 6 communicate with enterprise planning system 12 via associated computing devices 8 and network 10. An update process module 20 receives newly submitted value sets and coordinates their incorporation into the data store. As described above, during the modeling stage, analysts 4 develop a calculation model 24 having a number of hierarchically arranged nodes representing various organizational units within enterprise 3, such as business units or departments, or different variables related by calculations that represent metrics relevant to the business process being modeled. The calculation model 24 relates the various value sets to each other, including the aggregations between variables at different levels within each organizational unit, and between values at one level of the organizational hierarchy to values at higher levels of that hierarchy.

Upon receipt of a new value set from user 6, update process module 20 determines which node of the calculation model 24 corresponds with each value set. Update process module 20 also determines the set of activities required to bring the data store up to date with the newly submitted value sets. Update process module 20 references calculation model 24 to determine which activities to perform in updating the data store to reflect the newly submitted value sets. Update process module 20 may also create any necessary records and lists required to manage each update process as new value sets are submitted. For example, update process module 20 may create an update process record corresponding to each update process. A calculation engine 21 performs the necessary calculations defined by the nodes in calculation model 24.

Update process module 20 further schedules from among available activities and identifies potentially conflicting updates between two or more simultaneously active update processes. Update process module 20 provides for reporting of consistent value sets while accumulations are ongoing. Update process module 20 allows labeling of consistent sets of node instances within the data store at particular points in time, and further provides for access to those labeled sets of data at a later time. Update process module 20 also identifies node instances that are no longer accessible by a query or update process so that they may be removed from the data store.

Figure 3A:
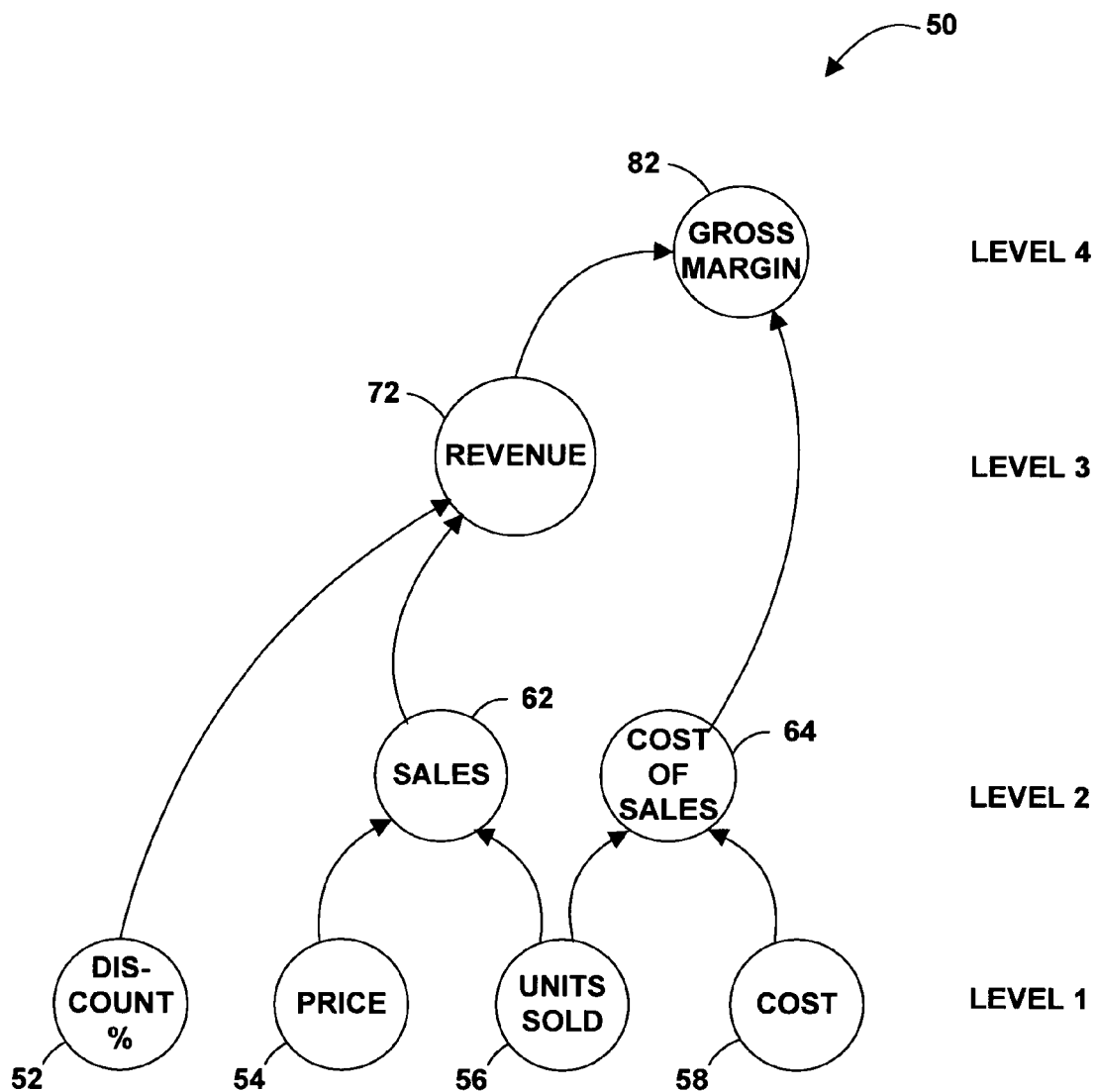
FIG. 3A is a block diagram showing an example directed acyclic graph (DAG) that illustrates a relationship between hypothetical computational tasks.

FIG. 3A is a block diagram showing an example calculation model 50. Conceptually, the calculation model may be arranged into a graph where edges of the graph relate to dependencies of value sets on each other, and the nodes of the graph are the actual calculations. In this embodiment, this graph is directed in the sense that each edge relates a source value to a target value of a calculation, and it is acyclic, in that no value can be input directly or indirectly to its own calculation. This type of graph is referred to as a Directed Acyclic Graph (DAG).

DAG 50 includes several leaf nodes 52, 54, 56, and 58. In this example, these leaf nodes are defined as discount % 52, price 54, units sold 56, and cost 58. Nodes of DAG 50 that are calculated based on other nodes are referred to herein as calculated nodes. Nodes 62, 64, 72, and 82 are examples of calculated nodes. In this example, these calculated nodes are defined as sales 62, cost of sales 64, revenue 72, and gross margin 82. Root nodes, such as node 82, are those nodes which are not inputs to the calculation of another node.

The lowest level of DAG 50, which consists of leaf nodes, is referred to as the leaf level, or level 1. The maximum number of nodes between a calculated node and a leaf node, including the node itself, is referred to herein as the level of the node. Thus, nodes 62 and 64 are at level 2, node 72 is at level 3, and node 82 is at level 4 in the example DAG 50.

DAG 50 represents a calculation model in which node 62 is calculated from nodes 54 and 56, node 64 is calculated from nodes 56 and 58, node 72 is calculated from nodes 52 and 62, and node 82 is calculated from nodes 64 and 72.

The value sets for each node may be single values, but in general they may contain an arbitrary number of measurements of the same core value type, varying by different characteristics such as product or time. The calculation process applies the same operation to all of the corresponding values in the input value sets. Node calculations might also be more complex in that they might not require that the input nodes to a calculation group the individual measurements in the same way as the target node.

The sets of values for each node are stored in a reliable and persistent store, such as database 14. From DAG 50 enterprise planning system 12 may determine how these value sets are related. As described herein, enterprise planning system 12 enables a newly submitted value set, which will be a subset of the overall set of value sets, to be aggregated into the data store in a manner that minimizes database contention while simultaneously allowing queries against the data store to return consistent, up to date results with only a short time lag while accumulations are ongoing, and that also allows users to continuously submit new value sets.

As enterprise planning system 12 receives newly submitted value sets, enterprise planning system 12 stores the submitted value sets in the persistent store, but rather than replacing the previous versions of those value sets, they are stored as new value sets associated with the previous value set but assigned a different sequential version number. Similarly, enterprise planning system 12 stores the calculated value sets derived from the newly submitted value sets as new versions in the data store, leaving the previous versions in place.

As discussed above, the set of activities to bring the entire data store into sync with a set of submitted value sets is referred to herein as an update process. As activities complete, more activities may be added to the update process. Because the calculation order is acyclic, each update process will eventually complete; that is, the newly submitted values sets will eventually be incorporated into the root nodes of the DAG for which the newly submitted value sets are a dependent. The action of submitting the value sets is complete at the point that the original value sets are saved into the data store.

The activities relating to an update process are performed until all activities are complete, at which point a new consistent version of the entire set of value sets (e.g., all nodes in DAG 50) is available for query. These activities may be interleaved with activities from an arbitrary number of other submitted value set changes and their associated update processes.

As stated above, the nodes of the DAG represent dependency relationships among the nodes. For purposes of the present description, a "dependent" value set is defined as an input value set to a computation of a target node. By this definition, nodes 54 and 56 are said to be "dependents" of node 62, nodes 56 and 58 are said to be dependents of node 64, nodes 52 and 62 are said to be dependents of node 72, and nodes 72 and 64 are said to be dependents of node 82. The value sets corresponding to nodes 54 and 56 are said to be "dependent value sets" of node 62, and so on.

When scheduling the activities for an update process, a subset of available activities are identified that are not inter-dependent. In other words, the activities that are scheduled first are those with dependent value sets that have already been updated or are not affected by the changes in the newly submitted value sets. The activities in this subset are scheduled for calculation by one or more calculation processes. Each of these activities may potentially be performed in parallel by different activity processes.

To identify a subset of activities that are not inter-dependent, enterprise planning system 12 determines a subset from among the set of available activities that do not require any other of those available activities to complete before they may be executed. In one embodiment, a measure is used for each node in the DAG which identifies its position relative to the leaf level (i.e. the level of nodes that are not calculated and do not depend on any other nodes). When activities are scheduled for execution, the algorithm releases only activities that have the same level measure, and only those in which that measure is the lowest value from among all available activities. In other words, a subset of the available activities is chosen where each activity is the same number of steps from the lowest level of the DAG, and is the smallest number of steps from the lowest level of the DAG among all available activities.

For example, referring to FIG. 3A, assume a user submitted a new value set into price node 54 and units sold node 56. The set of activities required to bring DAG 50 up to date with the newly submitted value set includes calculating nodes 62 (level 2), 64 (level 2), 72 (level 3), and 82 (level 4). The first set of activities to be scheduled would therefore be calculating nodes 62 and 64, as those level 2 tasks are the lowest level from among the available activities. These activities (the calculation of nodes 62 and 64) may be performed in parallel. After this level 2 task completes, enterprise planning system 12 would look among the remaining available activities, and see that the lowest remaining activity is accumulating node 72, a level 3 task. Finally, after calculating node 72, calculating node 82, a level 4 activity, would be scheduled.

When each activity completes, it adds activities to the list of available activities to which the just computed value set is a dependent, provided the activity is not already part of the update process. It then checks to see if any other activities are still active for the update process. If the current activity is the last activity executing within the scheduled group, then it again identifies which activities have all of their dependent value sets updated or which don't need to be updated, and schedules that subset of activities for calculation.

When the last activity completes and there are no more activities in the update process, then the update process is complete and the initially submitted new value set will have been applied throughout all value sets (nodes) within the DAG.

Figure 3B:
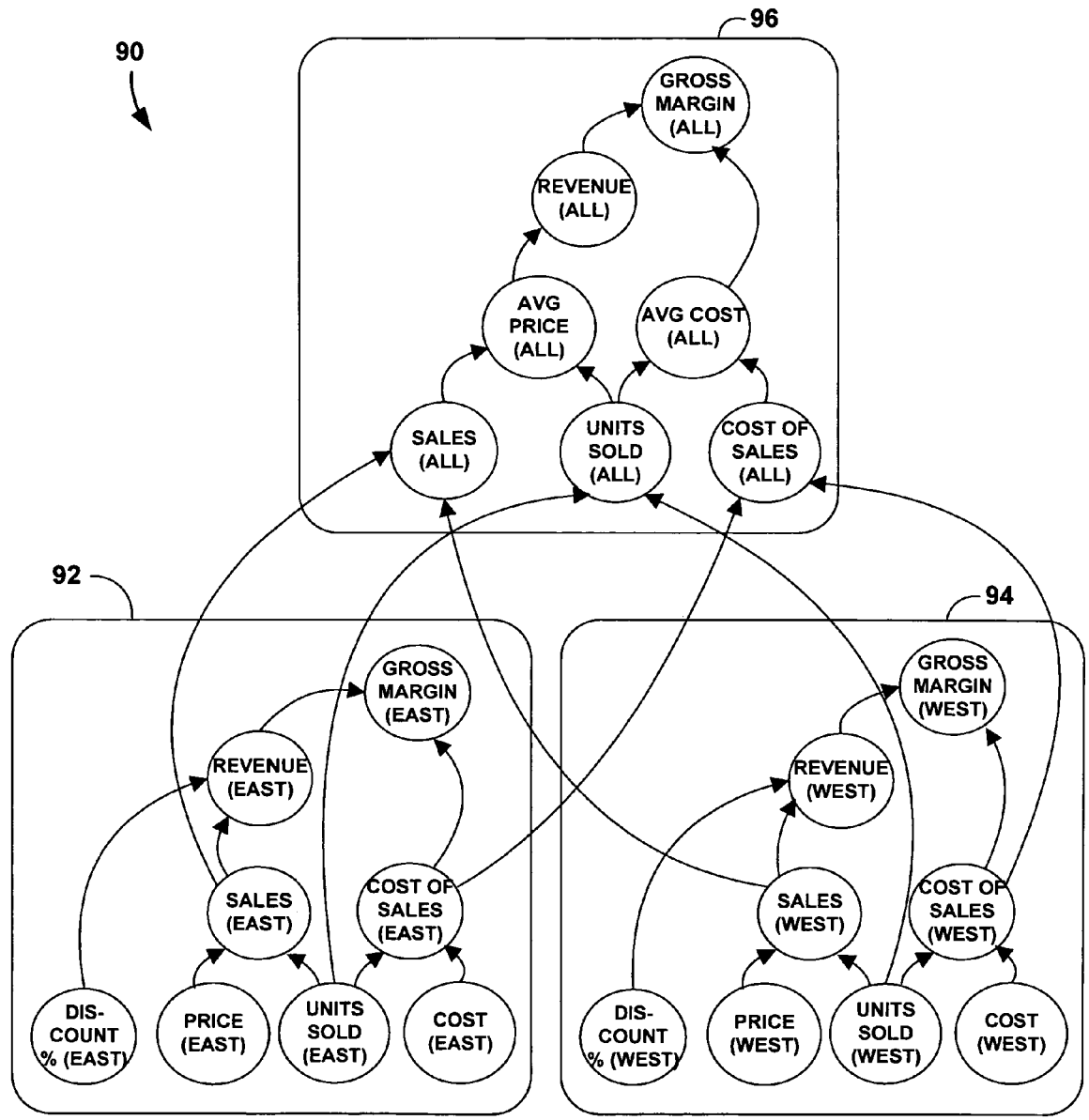
FIG. 3B is a block diagram showing an example DAG for a hypothetical organization.

FIG. 3B shows a block diagram showing an example DAG 90 for a hypothetical organization. DAG 90 shows a hypothetical organization with an "East" and "West" region rolling up into an "All Regions" summary. The computational model for the East Region is denoted by reference numeral 92, the computational model for West Region is denoted by reference number 94, and the computational model for All Regions is denoted by reference numeral 96.

In DAG 90, the nodes "Discount %" in the East Region DAG 92 and the West Region DAG 94 are only used to compute the "Revenue" nodes in each of DAGs 92 and 94, and is not rolled up into All Regions DAG 96. "Sales" and "Cost of Sales" nodes in DAGs 92 and 94 are computed at the region level but are summed to the All Regions level in order to derive weighted averages for "Price" and "Cost" in All Regions DAG 96. Thus, the example organizational/computation DAG 90 shown in FIG. 3B illustrates that the calculations can vary in different levels of the organization.

Figure 4:
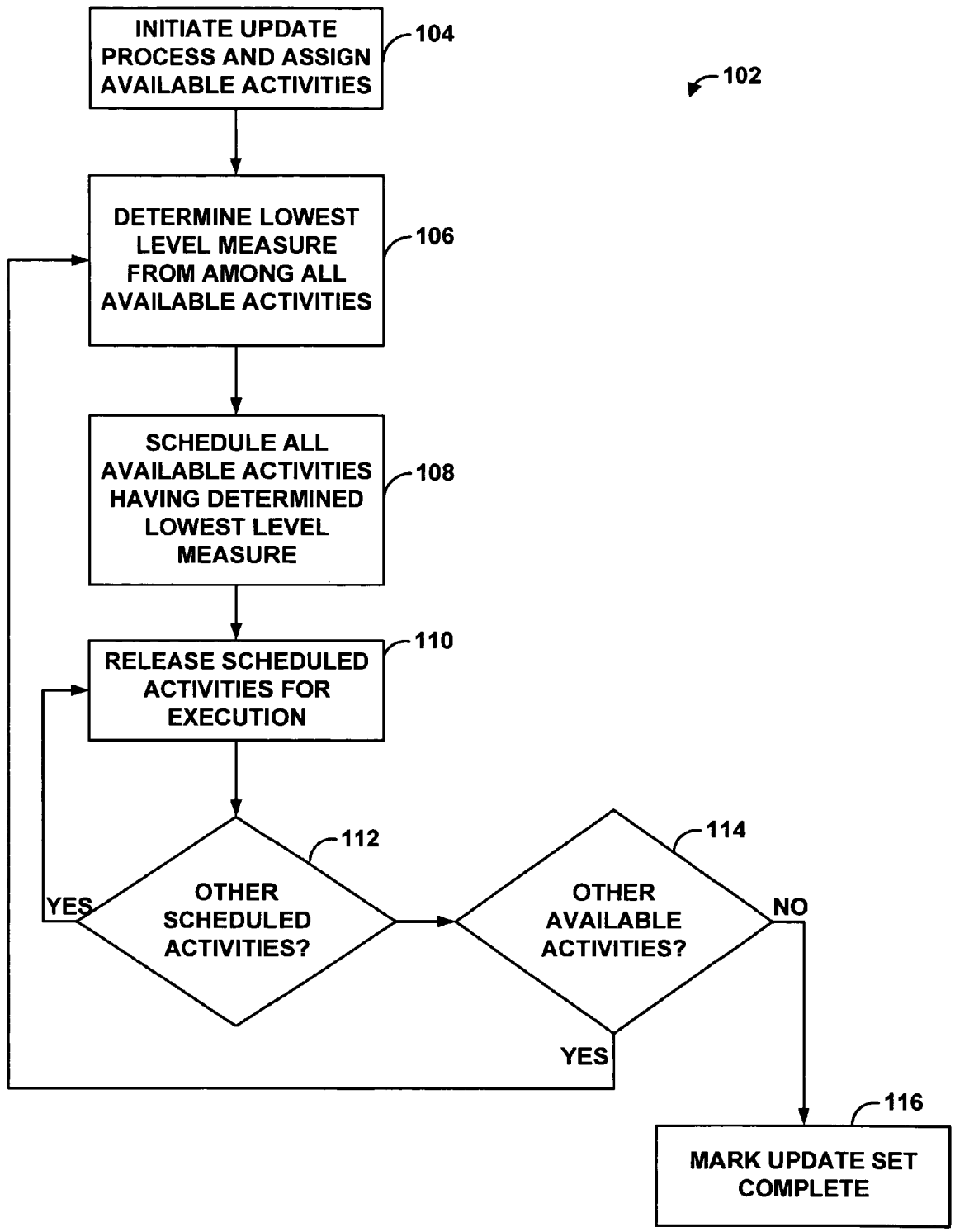
FIG. 4 is a flowchart illustrating a generalized overview of operation of an enterprise planning system in implementing an update process.

FIG. 4 is a flow chart illustrating an exemplary operation of update process module 20 in implanting an update process (102). Upon receipt of a newly submitted value set, update process module 20 initiates an update process and assigns available activities required to update the data store to reflect the newly submitted value set (104). When scheduling the activities for an update process, only activities that are not inter-dependent, that is, those in which all dependent value sets have already been updated or are not affected by the submitted value set changes, are scheduled. To identify activities that are not inter-dependent, update process module 20 determines the lowest level measure from among all available activities (106). Update process module 20 then schedules for execution all available activities having the determined lowest level measure (108). In this way, only activities having the same level measure, where that measure is the lowest among all available activities, are scheduled for execution. In other words, each scheduled activity is the same number of steps from the lowest level in the DAG, and that number of steps is the smallest among all available activities.

Once the appropriate activities are scheduled, update process module 20 releases the scheduled activities for execution (110). Update process module 20 checks whether there are any other scheduled activities (112). If so, update process module 20 may release another of the scheduled activities (110). Alternatively, if there are no other scheduled activities, update process module 20 checks whether there are any other available activities for the update process (114). If not, update process module 20 marks the update process as compete (116). If there are any other available activities for the update process (114), update process module 20 again determines the lowest level measure from among the available activities (106) and schedules them for execution (108).

Enterprise planning system 12 is able to identify when the processing of several different update processes leads to a situation where a given derivation of a value set would not be consistent with the overall data store. Update process module 20 within enterprise planning system 12 identifies such potentially inconsistent updates. Such potentially inconsistent updates may occur when there are two or more simultaneously active update processes. Because the activities within an update process may not complete at the same time, an update process may not have entered updated value sets in all of the input nodes of a target node that another update process is ready to calculate. For example, if a target node has two input nodes, and a first update process has updated one of the input nodes, but a second update process has not yet updated the second input node, then the first update process should not attempt to calculate the target node because the calculation of the target node would not yet have the most recent data for the second input node.

In this situation, when a first update process determines that a second update process has updated a dependent (an input value set to a computation), but has not updated the current target node, the first update process sets up an "association" with the second update process. In this situation, the second update process becomes responsible for updating the target node for both associated update processes. The second update process performs both computations when it reaches the point of computing the target value set, and will store a value set combining all of the changes from both update processes in a single augmented value set. This association procedure can extend to an arbitrary number of update processes as required. An association persists until all update processes that are a member of the association are complete.

Figure 5:
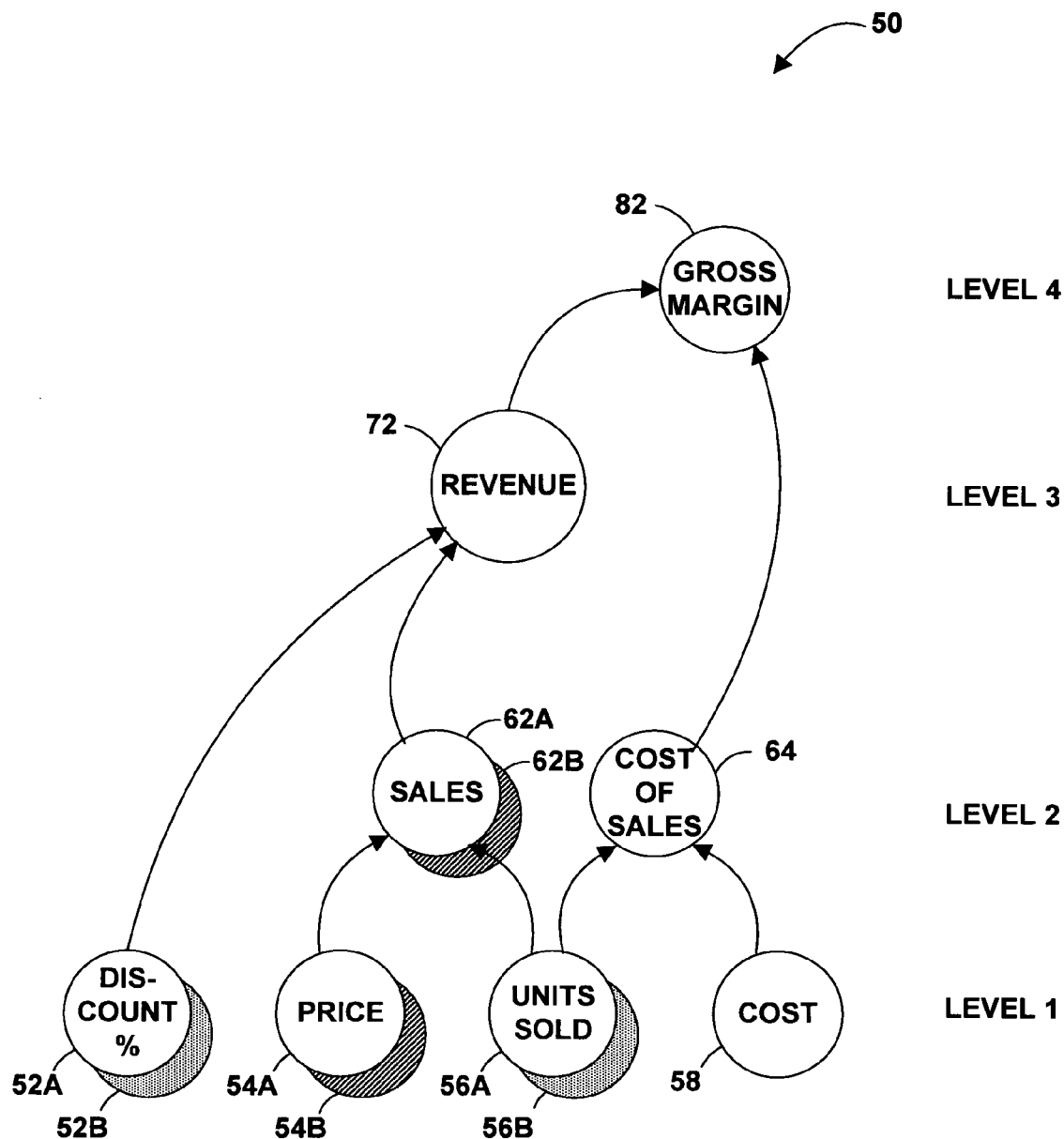
FIG. 5 is a block diagram illustrating an example DAG having two active update processes.

FIG. 5 is a block diagram of the exemplary DAG 50 illustrating an example update process association as described above. DAG 50 of FIG. 5 has the same node and edge relationships as DAG 50 shown in FIG. 3A. DAG 50 has two currently active update processes. Previous versions of nodes are indicated by nodes 52A, 54A, 56A, and 62A. Updated versions of those nodes are indicated by nodes 52B, 54B, 56B, and 62B, respectively. A first update process (hashed) has updated nodes 54B and 62B. A second update process (gray shaded) has updated newly submitted value sets into nodes 52B and 56B. Assume that at the point in time illustrated in FIG. 5, the first update process is ready to update node 72. In other words, the current target node for the first update process is node 72. However, the second update process (which updated node instances 52B and 56B) has not yet updated node 62, an input to the target node 72. In this situation, the first update process determines that the second update process has updated a dependent (node 52B in this example) to target node 72, but not yet updated node 62 or 72. If the first update process went ahead and updated node 72, the update would be inconsistent because it would include only part of the data from the first update process, namely node 52B but not node 56B.

The first update process therefore sets up an "association" with the second update process. With this association, the second update process becomes responsible for updating target node 72 for both the first and the second update processes. The association persists until both updates are complete, as computed value sets for nodes 72 and 82 incorporate data from both task sets. Thus, in this example, the first update process "hands-off" the calculation of node 72 to the second update process. Once the second update process has updated node 62 (at which point it will have created a node 62C, not shown) it will perform the update of node 72 for both the first and the second update process, creating a single new node instance 72B (not shown) that incorporates the newly submitted values sets 52B, 54B, and 56B.

When an update process associates with another update process, the associating update process informs the other update process of the association and "hands-off" its computation of node 72.

To identify potentially conflicting updates, update process module 20 uses a measure for each node in the DAG which identifies its position relative to the leaf level. When a series of activities are scheduled for execution, the algorithm releases only activities that have the same minimal level measure. Update process module 20 remembers the level of those activities that are available for execution. When a first update process prepares to calculate a node, it checks each dependent and identifies the update process that created the most recent version. If the level of a second update process associated with the most recent version of a dependent node is below that of the target node, then the first update process sets up an association with the second update process and lets the second update process complete the calculation. Since all update processes respect the dependency information in the DAG, the other update process will at some point perform the calculation of the target node.

Figure 6:
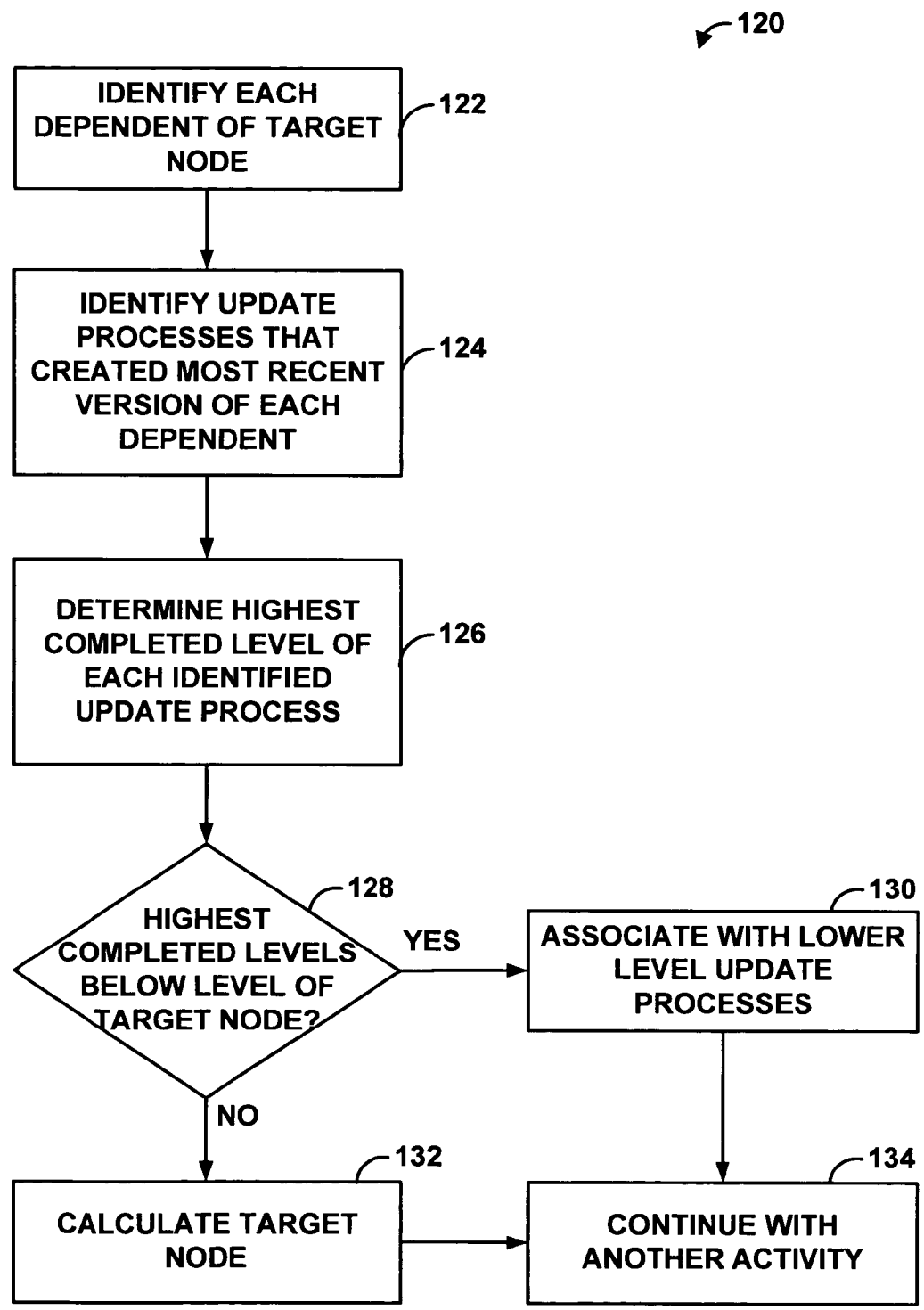
FIG. 6 is a flowchart illustrating exemplary operation of an enterprise planning system in setting up an association between two active update processes.

FIG. 6 is a flowchart illustrating an exemplary operation of update process module 20 in identifying potentially inconsistent updates and setting up associations between any so-identified potentially conflicting update processes (120). As newly submitted value sets are incorporated into the data store, update process module 20 creates an associated list of dependent value sets for each instance of a value set. The dependent value set list records the specific versions of each value set that was used in the computation of that particular node instance. In FIG. 6, for example, the dependent value set lists for each node in DAG 50 would be as follows:

| Node | Dependent Value Sets |
|------|----------------------|
| 62A  | 54A, 56A             |
| 62B  | 54B, 56A             |
| 64   | 56A, 58              |
| 72   | 52A, 62A, 54A        |
| 82   | 72, 64               |

To identify potentially inconsistent updates, when a first update process prepares to calculate a target node, update process module 20 identifies each dependent of the target node (122). Once each dependent of the target node is identified, update process module 20 identifies the update process that created the most recent version of each dependent (124). Update process module 20 determines the highest completed level of each identified update process (126). If the level associated with each identified update process is not below that of the target node (128) (in other words, the level associated with each identified update process is at or above the level of the target node), then that update process has completed its calculation to at least the level of the target node in the DAG, and the value sets below that level are therefore consistent with that update process. Update process module 20 will then calculate the target node (132).

Once the target node is calculated, update process module 20 may continue with another activity (134). Alternatively, if the level associated with any of the identified update processes is below that of the target node (128) the first update process "associates" itself with the lower level update process (130). In doing so, the first update process informs the lower level update process of the association and that it should complete the calculation of the target node for the higher level update process. By setting up this association, update process module 20 "hands-off" calculation of the target node from the first update process to the lower level update process. At this point, because calculation of the target node was handed off by association with a lower level update process, update process module 20 may proceed with another activity (134).

The present invention provides an assurance that the update process that creates any specific version of a node will never be at a higher level than an update process that create any prior version of the node. This assurance allows the consistency status of any given node to be determined by examining its most recent version. In other words, by providing this assurance, it is not necessary to examine the status of any update processes that created any of the prior versions of a node, only that which created the most recent version.

To accomplish this, update process module 20 provides an ordering constraint which prevents an update process from computing nodes at a higher level in the DAG than another update process that was at or above the level in the DAG but might otherwise fall behind that update process at some later point. When a new version of a node is created, update process module 20 determines the status of the update process that created the prior most recent version of that node. If that update process has not yet completed, then an ordering constraint is set up between the two update process such that the update process setting up the ordering constraint is not permitted to compute nodes at a higher level in the DAG than the update process that created the most recent version of the node.

When an update process finds that it has exhausted its set of scheduled activities and goes to schedule another group of the available activities, it first identifies the lowest level measure of all of its available activities. It compares this lowest level measure with the level of each update process having an attached ordering constraint. If its lowest level measure is higher than the level at which any such update process is currently executing activities for, then the current update process does not schedule any new available activities at that time. Instead it puts itself into a "blocked" state pending a change in the level of those update processes having an attached ordering constraint.

When another update process finds that it has exhausted its set of scheduled activities and is able to schedule additional activities and hence move to a higher level for task executions, it checks to see of there are any attached update processes that are blocked waiting for it to advance. If there are any such update processes, they will be unblocked so that they can re-examine their sets of available activities and, if no longer constrained, schedule additional activities for execution. If any of these other update process finds that it still must wait for yet some other update process, it could again put itself into a "blocked" state waiting for another update process to move higher in the DAG.

Figure 7:
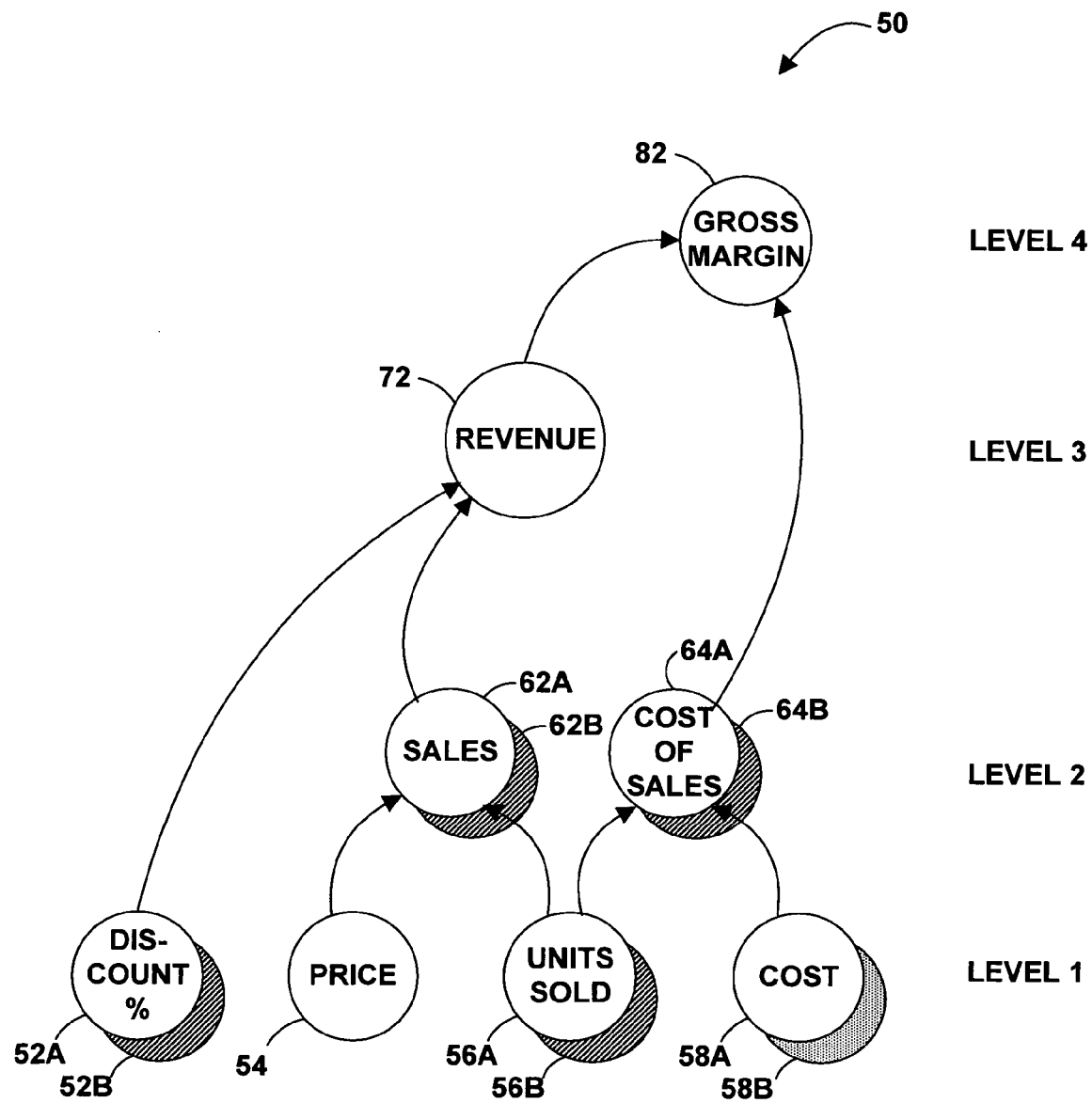
FIG. 7 is a block diagram illustrating another example DAG having two active update processes.

FIG. 7 is a block diagram of the exemplary DAG 50 illustrating an example ordering scenario. DAG 50 of FIG. 7 has the same node and edge relationships as DAG 50 shown in FIG. 3A. DAG 50 has two currently active update processes. Previous versions of nodes are indicated by nodes 52A, 56A, 58A, 62A, and 64A. Updated versions of those nodes are indicated by nodes 52B, 56B, 58B, 62B, and 64B, respectively. A first update process (hashed) has updated nodes 52B, 56B, 62B, and 64B. A second update process (gray shaded) has updated newly submitted value sets into node 58B. The second update process is now ready to compute nodes 64 and then node 82. However, if after the second update process computes node 64 it goes ahead to compute node 82, a query requesting nodes 82 and/or 72 may not result in a consistent report, because the query examining node 82 (which was updated by the second update process) would not be aware that the first update process is still active but has not yet incorporated all of its data up into nodes 72 or 82.

To prevent this situation from occurring, after updating node 64 (thus creating a new node instance 64C, not shown) the second update process would determine which update process created the prior most recent version of that node. In this example, the first update process created node 64B, the prior most recent version. The second update process then checks the level of the first update process, and determines that the first update process is at level 2. The second update process would then attach an ordering constraint with the first update process, putting itself in a "blocked" state until the first update proceeds at least to the same level as the next activity of the second update process. After the first update process has completed its level 3 task (updating node 72) and its level 4 task (updating node 82), the first update process would "unblock" the second update process, allowing it to update node 82.

Figures 8A, 8B:
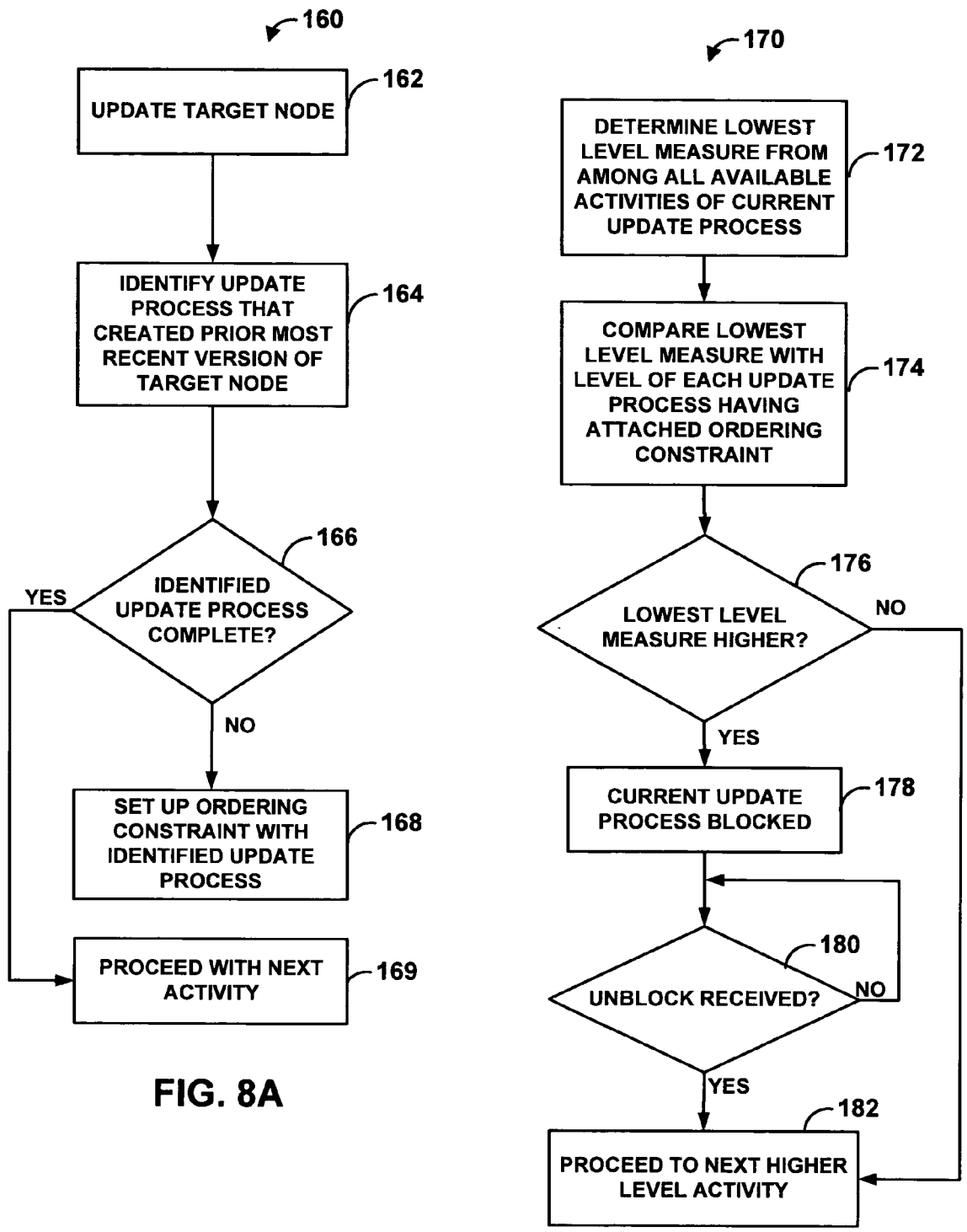
FIGS. 8A and 8B are flowcharts illustrating exemplary operation of an enterprise planning system in attaching an ordering constraint between two active update processes and operating with an ordering constraint.

FIG. 8A is a flowchart illustrating an exemplary operation of update process module 20 in setting up an ordering constraint (160). Enterprise planning system 12 ensures that the update process that creates any specific version of a node will never be at a higher level than the update process that created any prior version of the node. To determine the status of any given node, it is not necessary to examine the status of any update processes that created any of the prior versions of that node, only the update process that created the most recent version of the node.

When a first update process creates a new version of a target node (162), update process module 20 determines the status of the update process that created the prior most recent version (164). If that second update process has completed (166), then update process module 20 allows the first update process to proceed with the next activity (169). If that second update process has not completed (166), then update process module 20 sets up an ordering constraint such that the first update process is not permitted to compute nodes at a higher level in the DAG than the second update process (168).

FIG. 8B is a flowchart illustrating an exemplary operation of update process module 20 for an update process having at least one ordering constraint (170). When an update process is ready to schedule another group of the available activities, it determines the lowest level measure of all of its available activities (172). It compares this lowest level measure with the level of any update process having an attached ordering constraint (174). If its lowest level measure is higher than the level of any such update process (176), then the first update process does not schedule any new available activities at that time. Instead it puts itself into a "blocked" state pending a change in the level of those update processes having an attached ordering constraint (178).

When an update process having an attached ordering constraint has exhausted its set of scheduled activities and is able to schedule additional activities and hence move to a higher level for task executions, it checks to see of there are update processes that are blocked waiting for it to advance. If there are other such update processes, they will be unblocked so that they can re-examine their sets of available activities and, if no longer constrained, schedule additional activities for execution. When an update process is unblocked (180) that update process may proceed with a next higher level activity (182). If the other update process finds that it still must wait for some other update process, it could again put itself into a "blocked" state waiting for another update process to move higher in the DAG.

Enterprise planning system 12 provides the ability to collect/report a set of value sets that are consistent with each other, even if some of the value sets were calculated by update processes that are still active. That is, if the calculations that are part of the basic model for the DAG are applied to the actual values that are returned from the lowest levels of the query results, then answers will agree with the results in the calculated nodes returned with the query.

As described above, each instance of a value set has an associated list of dependent value sets. The dependent value set list records the specific versions of each value set that was used in the computation of that particular node instance. To identify consistent sets of value sets, update process module 20 first locates the highest level value sets in the DAG requested in the query (i.e., the nodes in the query which are the maximum distances from the leaf level). These can be thought of as the root nodes for that query. Update process module 20 finds the latest version of each of these value sets where the corresponding update process has proceeded past the highest level requested in the query. Since the update processes have calculated above this point in the DAG (or have completed execution), it is known that value sets exist at or below that level that are consistent with those update processes.

Update process module 20 follows the list of dependencies from these root nodes (the root nodes of the query). It may need to trace through nodes that are not part of the actual query in order to locate value sets required to satisfy the query. Following the list of dependent value sets through the dependency chain will result in a set of value sets that are all consistent with the root nodes (of the query) that were identified, and so which are internally consistent.

To illustrate, consider again the situation shown in FIG. 5. A request for the three nodes revenue 72, sales 62, and discount % 52 will identify node 72 as the root node for the query. The most recent completed version of this node is node 72. Node 72 is linked through its dependent value set list to previous versions of nodes 52 and 62, namely, 52A and 62A. These versions are consistent with that specific version of node 72. Thus, the versions reported in response to the query would be the value sets 72, 52A and 62A.

As another example, if a query requested sales 62, price 54 and units sold 56, the latest versions 62B, 54B and 56B of those nodes do not form a consistent set because only the input data derived through the second update process (namely the value set corresponding to 54B) has been incorporated into node 62B, while the first update process has not yet incorporated the value set corresponding to node 56B into sales node 62. In this case, the root node for the query is node 62. The previous version of node 62, namely node instance 62A, as well as nodes 54A and 56A, will be returned by the query, as these nodes comprise the most recent consistent set.

However, if only sales 62 and price 54 were requested by the query, the query would return the most recent versions of these two nodes (namely, nodes 62B and 54B, respectively). The root node for this query is node 62, and the second update process has already progressed to at least that level (level 2) so this group of nodes is internally consistent. If the query request nodes 54 and 56, the latest versions of these nodes, 54B and 56B would be returned, as these nodes are not dependent upon each other in any way.

Figure 9:
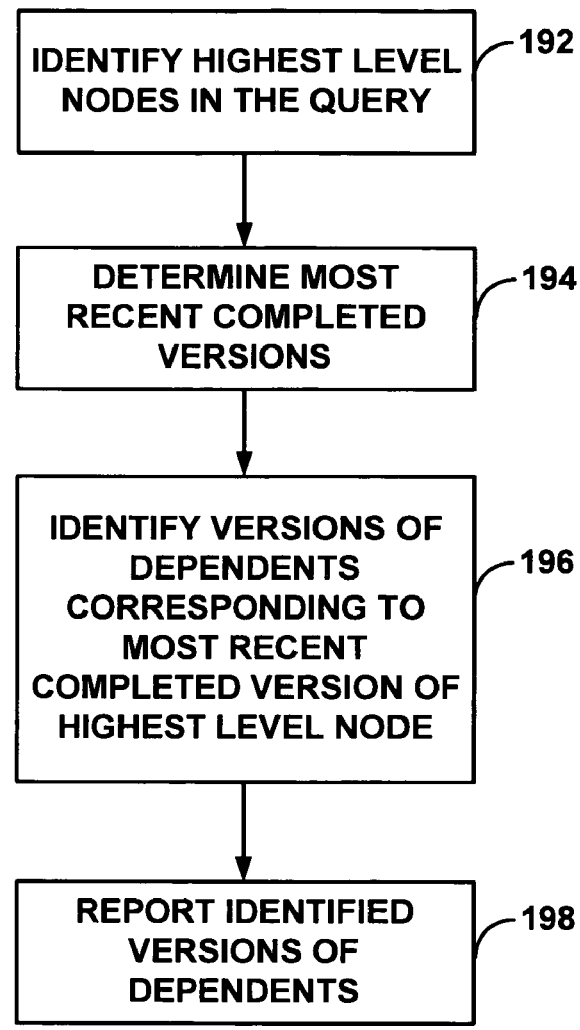
FIG. 9 is a flowchart illustrating an exemplary operation of an enterprise planning system in reporting consistent sets in response to a query.

FIG. 9 is a flowchart illustrating an exemplary operation of update process module 20 in reporting consistent sets in response to a query as described above (190). Update process module 20 identifies the highest level node or nodes in the query, or the "root nodes" for the query (192). Update process module 20 determines the most recent completed version of each value set for the highest level nodes (194). That is, update process module 20 finds the latest version of each of the root node value sets where the corresponding update process has proceeded past the highest level requested in the query. Since the corresponding update process has calculated above this point in the DAG (or have completed execution), the value sets at or below that level are consistent with that update process.

Update process module 20 identifies all of the dependents, extending all the way down to the leaf levels of the DAG, of the most recent completed version of the highest level node (196). To do this, in one embodiment, update process module 20 follows the dependent value set lists of all dependents until all of the nodes throughout the DAG corresponding to the most recent completed version of the highest level node have been identified. Update process module 20 reports the identified dependent value sets corresponding to the most recent completed version of the highest level node (198). Enterprise planning system 12 thus provides for ongoing incorporation of newly submitted value sets into the DAG while simultaneously allowing queries to return value sets that are consistent with each other.

Enterprise planning system 12 provides a capability to label a chosen consistent set of node instances and to identify and access those node instances by specifying the label at some future time. A labeled consistent set reflects the state of the data store at the particular point in time associated with the label. In one embodiment, the set of node instances associated with a label may encompass instances of all nodes within the data store at the associated point in time.

Figure 10:
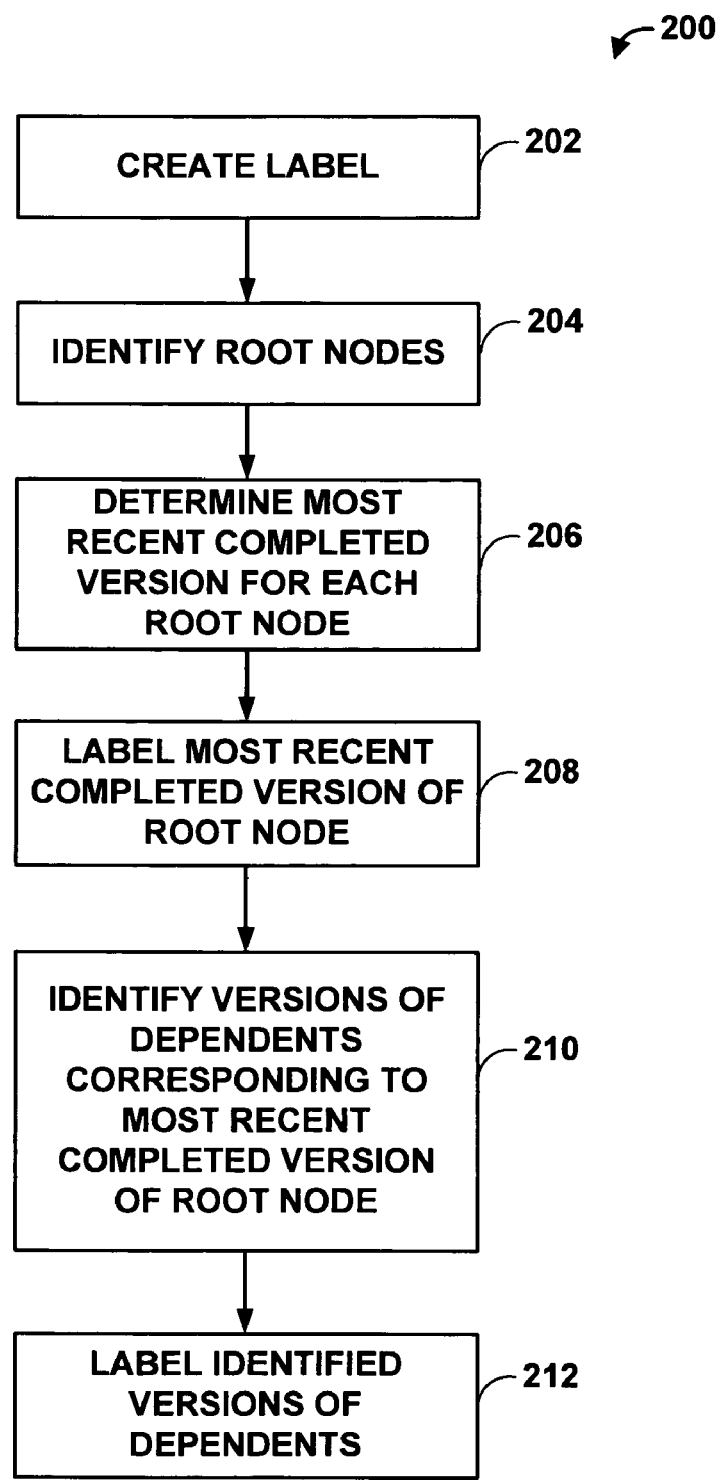
FIG. 10 is a flowchart illustrating an exemplary operation of an enterprise planning system in labeling consistent sets.

FIG. 10 is a flowchart illustrating an exemplary operation of update process module 20 in creating a labeled consistent set of node instances across the data store at a particular point in time (200). To create a labeled consistent set, an administrator 16 or other user 8 creates a label as desired to describe the labeled consistent set (202). Update process module 20 identifies a set of root nodes (204) in the DAG. The set of root nodes is the set of nodes that do not have any outgoing edges in the DAG, i.e. that are not used as inputs to any other calculations described by the DAG.

Update process module 20 examines each root node in the DAG to determine the most recent version that was generated by a completed update process (206). To do this, update process module 20 identifies the most recent version of each root node and finds which update process created that version. According to the rules defining the DAG, when the update process that created the most recent version of a root node is complete, then the corresponding version of all nodes that serve as input to the root node must be consistent with the most recent version of the root node. Update process module 20 attaches the selected label to that most recent version of the root node (208). Update process module 20 then identifies (210) corresponding versions of the dependent value sets that served as input to the most recent version of the root node, including all dependents extending down to the leaf levels of the DAG. For example, in one embodiment, update process module 20 follows the dependent value set lists until all nodes throughout the DAG corresponding to the most recent version of the root node are identified (212). Update process module 20 labels identified versions of all dependents throughout the DAG corresponding to the most recent completed version of each root node (214).

In one embodiment, if more than one instance of a particular node is identified in this process (which may occur when a node is input to multiple other nodes) the most recent instance of the node is chosen. Following the dependency relationships repeatedly from all root nodes will enumerate instances of all nodes within the data store. The entire set of node instances so identified are thus associated with the label. Enterprise planning system 12 thus provides a user with the ability to access a consistent set of data reflecting the state of the data store at the particular point in time associated with the label.

In the embodiment shown in FIG. 10, a labeled consistent set is reflective of the state of the data store at the particular point in time at which the label is created. In another embodiment, a user 6 may specify a point in time of which the label should reflect. In such an embodiment, label module 28 would label the most recent completed version of each of the root nodes as of the specified period of time and then label the versions of all input nodes corresponding with the most recent completed version as of the specified period of time.

As users continue to add new data into enterprise planning system 12, newer versions of nodes will replace older versions. Throughout this process, certain of the node instances throughout the data store will become "obsolete" in the sense that they are neither part of the most recent consistent set, part of a labeled set that a user may reference at some future time, or part of a currently executing update process. Update process module 20 provides for identification of these "obsolete" node instances so that they may be removed from data store 14. In this way, node instances that are no longer necessary, and any associated relationships and other overhead required to maintain these nodes may be removed from the store so that the space they occupy can be reused by enterprise planning system 12.

To determine which node instances are obsolete and may be deleted from the data store, enterprise planning system 12 identifies the nodes that should be kept. The node instances that should be kept may include, for example, the most recent consistent set, any labeled sets, and any node instances that are newer (i.e., more recent) than the most recent consistent set. This latter group of node instances should be kept because their associated update processes are still in the process of incorporating their associated newly submitted value sets into the data store. Labeled sets and the most recent consistent set should be kept because they may be referenced by a query at some future time.

Figure 11:
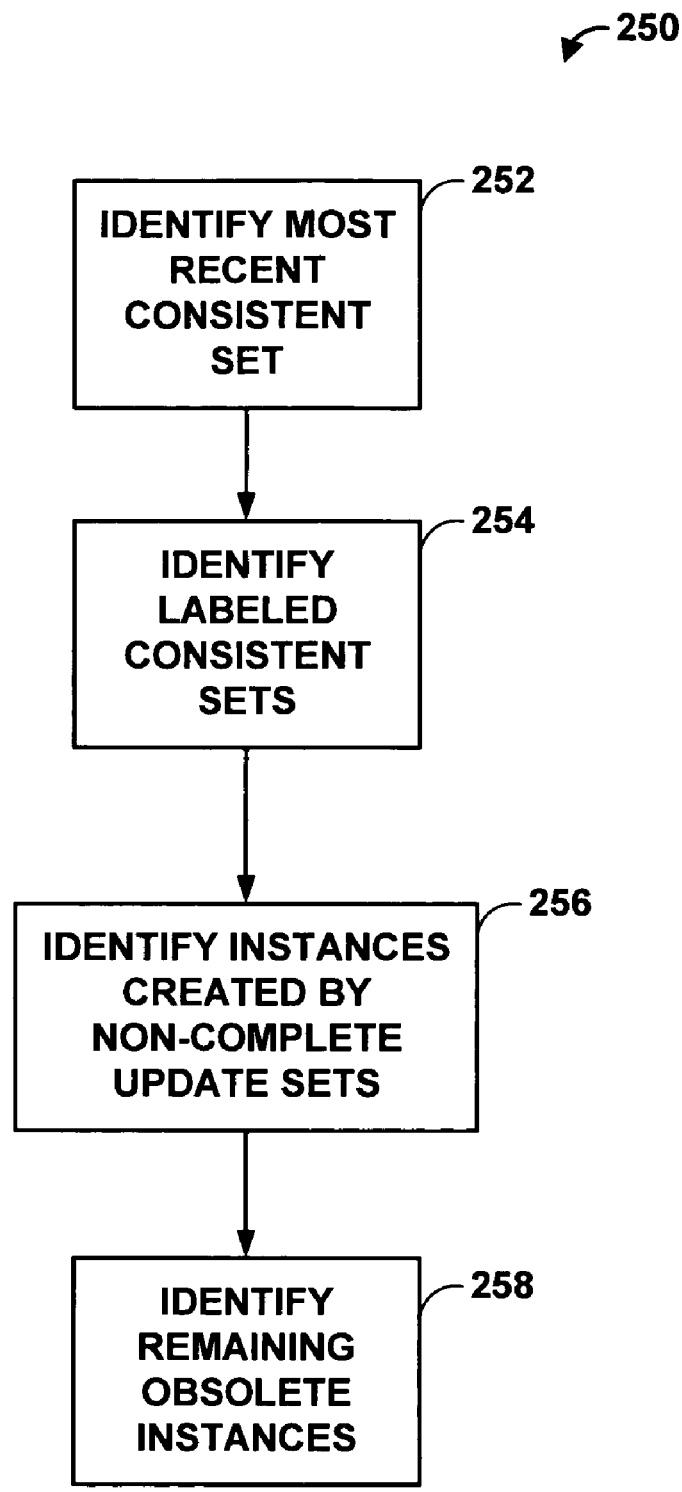
FIG. 11 is a flowchart illustrating an exemplary operation of an enterprise planning system in removing obsolete instances.

FIG. 11 is a flowchart illustrating an exemplary operation of update process module 20 in removing obsolete instances from the data store (250). To determine a set of obsolete instances that may be removed from the data store 14, update process module 20 may identify those node instances that should be kept, and identifies as obsolete any remaining instances. To that end, update process module 20 may identify the most recent consistent set (252). The procedure for identifying the most recent consistent set may be similar to the procedure for creating a labeled consistent set as described above with respect to FIG. 10. Update process module 20 may also identify all labeled consistent sets (254) associated with the data store 14. Update process module 20 may also identify any remaining node instances that are newer than the node instances in the most recent consistent data set. The node instances that are not newer may be removed. In other words, update process module 20 may identify any remaining node instances created by a currently executing update process (i.e., an update process that has not yet completed) (256). Update process module 20 may then identify any remaining node instances as obsolete (258).

The update process techniques described herein may be implemented in hardware, software, firmware, or any combination thereof. The invention may be embodied as a computer-readable medium that includes instructions for causing a programmable processor to carry out the methods described above. For example, the computer readable medium may comprise random access memory (RAM), read-only memory (ROM), non-volatile random access memory (NVRAM), electrically erasable programmable read-only memory (EEPROM), flash memory, magnetic or optical media, or the like. The instructions may be implemented as one or more software modules, which may be executed by themselves or in combination with other software.

The instructions and the media are not necessarily associated with any particular computer or other apparatus, but may be carried out by various general-purpose or specialized machines. The instructions may be distributed among two or more media and may be executed by two or more machines. The machines may be coupled to one another directly, or may be coupled through a network, such as a local access network (LAN), or a global network such as the Internet.

The invention may be embodied as one or more devices that include logic circuitry to carry out the functions or methods as described herein. The logic circuitry may include a processor that may be programmable for a general purpose or may be dedicated, such as microcontroller, a microprocessor, a Digital Signal Processor (DSP), Application Specific Integrated Circuit (ASIC), and the like.

Various embodiments of the invention have been described. These and other embodiments are within the scope of the following claims.

The invention claimed is:

1. A method comprising:
storing enterprise planning data in a data store according to a calculation model for an enterprise planning system, wherein the calculation model includes a plurality of hierarchically arranged nodes, and wherein each node has a corresponding level measure which identifies the node's position relative to a leaf level of the hierarchically arranged nodes;
receiving a submitted value set from a user corresponding to a leaf node in the calculation model;
initiating an update process to accumulate the submitted value set into the data store, wherein the update process includes a set of activities each corresponding to a node in the calculation model;
determining a subset of the set of available activities that are not inter-dependent;
scheduling the activities of the subset that correspond to nodes having a lowest one of the level measures; and
executing the scheduled activities.

2. The method of claim 1, wherein executing the scheduled activities comprises:
completing a scheduled activity to create an updated value set for the corresponding node in the calculation model;
adding to the set of available activities additional activities to which the updated value set is a dependent.

3. The method of claim 2 further comprising assigning a version to the updated value set and storing the updated value set in the data store.

4. The method of claim 2 further comprising maintaining list of versions of dependents that were inputs to the updated value set.

5. The method of claim 2, further comprising:
determining whether there are any remaining scheduled activities; and
determining a subset from the set of remaining scheduled activities that are independent.

6. The method of claim 5, further comprising:
determining whether there are any remaining available activities;
scheduling the remaining available activities.

7. The method of claim 1, further comprising initiating a plurality of update processes, each corresponding to one of a plurality of submitted value sets.

8. The method of claim 7, further comprising:
identifying an activity assigned to a first update process which would result in a conflicting update with a second update process, wherein the first update process has an associated higher level measure and the second update process has an associated lower level measure; and
handing-off the activity assigned to the first update process to the second update process.

9. The method of claim 1, further including identifying consistent versions of nodes in the calculation model in response to a query.

10. The method of claim 9, wherein identifying consistent versions of nodes further comprises:
identifying a highest level node in the query;
determining the most recent completed version of the highest level node; and identifying versions of dependents to the highest level node corresponding to the most recent completed version of the highest level node.

11. The method of claim 1, further comprising labeling consistent versions of all nodes in the calculation model.

12. The method of claim 1, further comprising deleting obsolete versions of nodes in the calculation model.

13. The method of claim 1, wherein the calculation model comprises a directed acyclic graph.

14. A method comprising:
   storing enterprise planning data in a data store according to a calculation model for an enterprise planning system, wherein the calculation model includes a plurality of hierarchically arranged nodes, and wherein each node has a corresponding level measure which identifies the node's level within the hierarchically arranged nodes;
   receiving a submitted value set from a user corresponding to a leaf node in the calculation model;
   labeling consistent versions of all nodes in the calculation model by:
      selecting a label;
      identifying root nodes in the calculation model;
      determining a most recent calculated value set for each root node;
      identifying dependent nodes having values sets that served as input to the calculated value sets of the root nodes; and
      associating the selected label with the root nodes and the identified dependent nodes;
   initiating an update process to accumulate the submitted value set into the data store, wherein the update process includes a set of activities each corresponding to a node in the calculation model;
   determining a subset of the set of available activities that are not inter-dependent;
   scheduling the activities of the subset that correspond to nodes having a lowest one of the level measures; and
   executing the scheduled activities.

15. A method comprising:
   storing enterprise planning data in a data store according to a calculation model for an enterprise planning system, wherein the calculation model includes a plurality of hierarchically arranged nodes, and wherein each node has a corresponding level measure which identifies the node's position relative to a leaf level of the hierarchically arranged nodes;
   receiving a submitted value set from a user corresponding to a leaf node in the calculation model;
   deleting obsolete versions of value sets for nodes in the calculation model by:
      identifying a consistent value set in the calculation model that was most recently created;
      identifying any labeled consistent value sets in the calculation model;
      identifying any value sets created by an update process that is in progress; and
      deleting any remaining value sets in the calculation model;
   initiating an update process to accumulate the submitted value set into the data store, wherein the update process includes a set of activities each corresponding to a node in the calculation model;
   determining a subset of activities from the set of available activities that are not inter-dependent;
   scheduling the activities of the subset that correspond to nodes having a lowest one of the level measures; and
   executing the scheduled activities.

16. A system comprising:
   at least one computer having a programmable processor;
   an enterprise planning system to execute on the computer and perform an enterprise planning session for a set of enterprise users in accordance with a calculation model, wherein the calculation model defines hierarchically arranged nodes, wherein each node in the calculation model has an associated level measure that identifies the node's level within the hierarchically arranged nodes; and
   an update process manager executing on the computer to initiate update processes to accumulate submitted value sets from users into the data store, wherein each update process includes a set of activities that correspond to nodes in the calculation model;
   wherein the update process manager further identifies potentially conflicting activities among the update processes;
   wherein the update process manager identifies consistent versions of nodes in the calculation model in response to a query,
   and wherein the update process manager schedules the activities that are available for execution and that have a lowest one of the level measures.

17. The system of claim 16, wherein the update process manager labels consistent versions of all nodes in the calculation model.

18. The system of claim 16, wherein the update process manager deletes obsolete versions of value sets in the calculation model.

19. The system of claim 16, wherein the calculation model comprises a directed acyclic graph.

20. A computer-implemented system comprising:
   at least one computer having a programmable processor;
   an enterprise planning system to execute on the computer and perform an enterprise planning session for a set of enterprise users in accordance with a calculation model, wherein the calculation model defines hierarchically arranged nodes; and
   an update process manager that initiates update processes to accumulate submitted value sets from users into the data store, wherein each update process includes a set of activities that correspond to nodes in the calculation model,
   wherein the update process manager further identifies potentially conflicting activities among the update processes,
   wherein the update process manager identifies consistent versions of nodes in the calculation model in response to a query, and
   wherein the update process manager identifies an activity assigned to a first update process which would result in a conflicting update with a second update process, wherein the first update process has an associated higher level measure and the second update process has an associated lower level measure, and hands-off the activity assigned to the first update process to the second update process.

* * * * *